United States Patent [19]
Ohno et al.

[11] Patent Number: 5,639,039
[45] Date of Patent: Jun. 17, 1997

[54] WINDING DEVICE

[75] Inventors: Takehisa Ohno; Shigeru Tanaka, both of Kanagawa, Japan

[73] Assignee: Fuji Photo Film Co., Ltd., Kanagawa, Japan

[21] Appl. No.: 583,432

[22] Filed: Jan. 5, 1996

[30] Foreign Application Priority Data

Jan. 12, 1995 [JP] Japan .................................. 7-003115

[51] Int. Cl.⁶ .................................. B65H 18/10
[52] U.S. Cl. .................................. 242/332.7; 242/532.7
[58] Field of Search .................................. 242/332.7, 532.7, 242/535.1

[56] References Cited

U.S. PATENT DOCUMENTS

| | | |
|---|---|---|
| 3,788,572 | 1/1974 | Wroblewski . |
| 4,111,379 | 9/1978 | Luscher . |
| 4,432,221 | 2/1984 | Barten .................................. 242/532.7 |
| 4,441,667 | 4/1984 | Bartel et al. . |
| 4,544,110 | 10/1985 | Nagel et al. . |
| 4,688,737 | 8/1987 | Kogane et al. . |
| 5,544,840 | 8/1996 | Murakami .................................. 242/532.7 |

FOREIGN PATENT DOCUMENTS

| | | | |
|---|---|---|---|
| 3034091A1 | 3/1982 | Germany | 242/332.7 |
| 231209A3 | 12/1985 | Germany | 242/532.7 |

*Primary Examiner*—John P. Darling
*Attorney, Agent, or Firm*—Sughrue, Mion, Zinn, Macpeak & Seas

[57] ABSTRACT

A winding device includes: a winding core capable of taking up an elongated photosensitive material; a guide member for forming a guide passage for the photosensitive material between the guide member and an outer peripheral surface of the winding core in a state in which the guide member is wound around the winding core; a guide arm which is rotated to allow a distal end thereof to be brought into contact with the winding core and adapted to guide the photosensitive material and the guide member along the guide arm from a proximal end side toward a distal end side of the guide arm; and a guide-member accommodating portion which is rotatively driven to pay out the guide member so as to cause the guide member to be wound around the winding core. Accordingly, a leading end portion of the photosensitive material is wound around the winding core for taking up the photosensitive material with a simple mechanism, and the guide member for causing the leading end of the photosensitive material to be wound can be accommodated compactly, thereby improving the operating efficiency at a time when the photosensitive material wound in roll form is removed.

20 Claims, 8 Drawing Sheets

WINDING DEVICE

BACKGROUND OF THE INVENTION

1. Field of the Invention

The present invention relates to a winding device for winding a leading end portion of a photosensitive material around a winding core for taking up the photosensitive material.

2. Description of the Related Art

When, for example, an inspecting operation is performed for determining appropriate exposure conditions by measuring the image densities of frames of negative films which are photosensitive materials, it is necessary to connect about 50 negative films to form one elongated negative film, and to wind a leading end portion of the elongated negative film around a winding core of a takeup shaft after the leading end portion is passed through an inspecting apparatus.

In this case, since the leading end portion is conventionally wound around the winding core by manual operation by an operator, work efficiency in the winding of the leading end portion around the winding core is poor.

Figure 7:
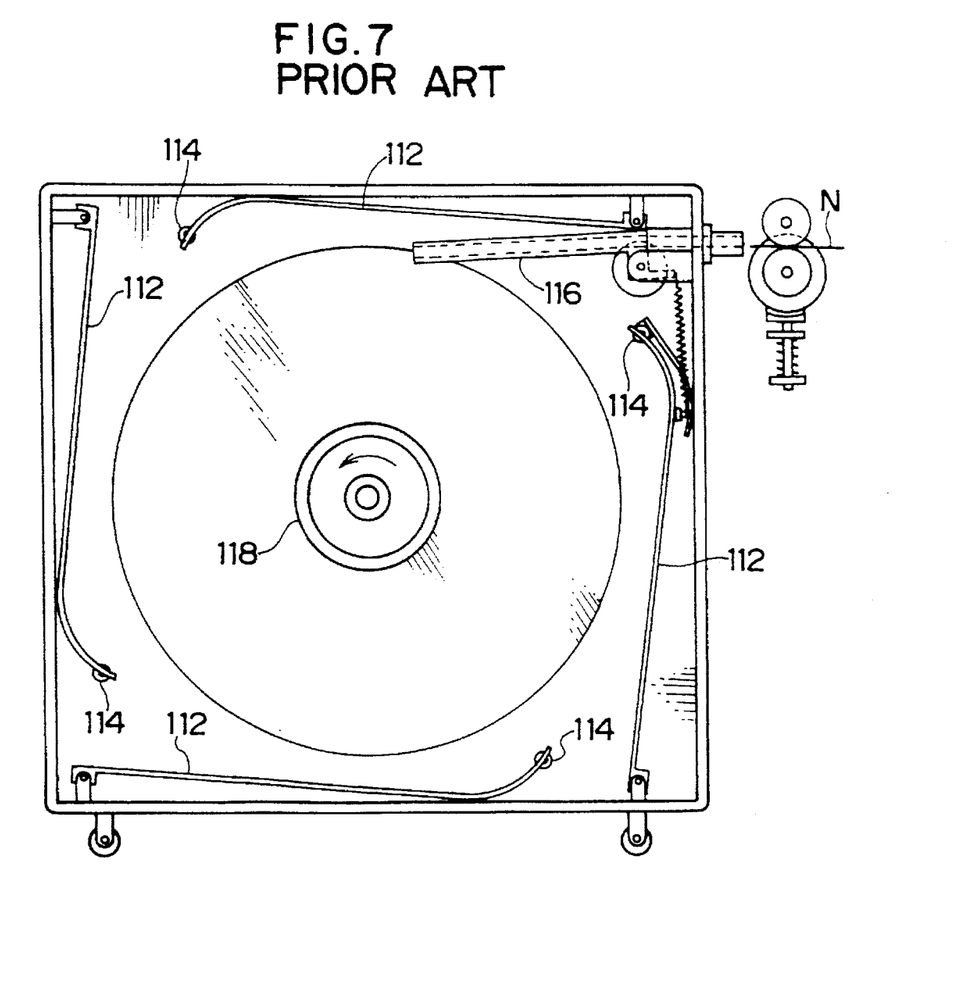
FIG. 7 is a plan view of a conventional winding device, and illustrates a state prior to starting a winding operation.
Figure 8:
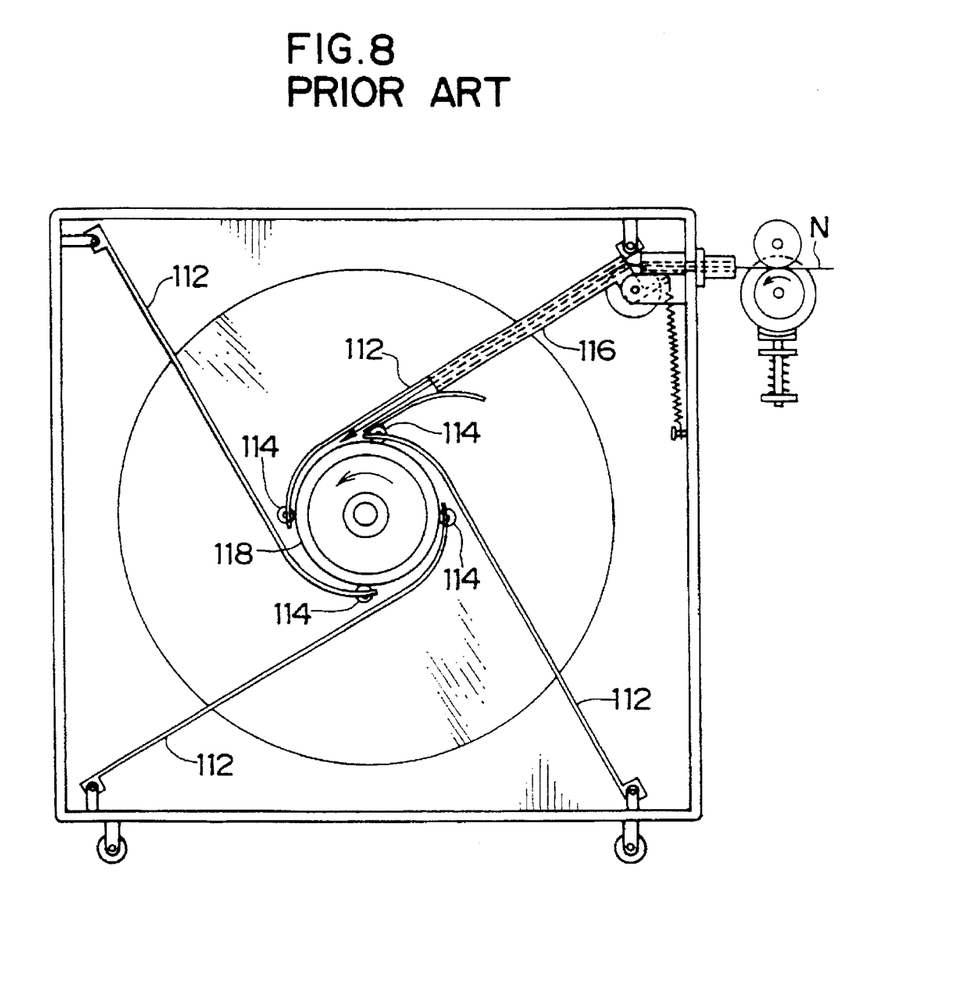
FIG. 8 is a plan view of the conventional winding device, and illustrates a state in which the winding operation is being carried out.

In addition, a winding device such as the one shown in FIGS. 7 and 8 for automatically performing the winding operation is known. In this winding device, rollers 114 are respectively supported at distal ends of four arms 112 disposed around a winding core 118 of a takeup shaft, and a guide 116 for guiding a negative film N is provided.

When the leading end of the negative film N is wound around the winding core 118 of the takeup shaft, the arms 112 in the state shown in FIG. 7 are first rotated such that the respective rollers 114 are brought into contact with the winding core 118, and the guide 116 is concurrently rotated such that the distal end of the guide 116 is located in the vicinity of the winding core 118, as shown in FIG. 8. In this state, the negative film N is fed, and is wound around the winding core 118.

After completion of the winding, the negative film N is consecutively taken up onto the winding core 118, and the rollers 114 and the guide 116 move to the outer side as the winding diameter changes.

However, although after completion of the inspection operation, it is necessary to remove the negative film N in the form of a roll wound around the winding core 118, this winding device has a drawback in that the rollers 114 and the guide 116 hinder the removal of the negative film N, resulting in poor operational efficiency.

Further, since the four arms 112, the four rollers 114, and the guide 116 are provided separately, if the winding diameter of the negative film N becomes large, a larger space is required for the device due to the space occupied by the four arms 112, the four rollers 114, and the guide 116, resulting in the drawback that the device becomes large.

In addition, a mechanism for separately actuating the guide 116 and the arms 112 for supporting the rollers 114 is required, so that there are drawbacks in that the mechanism becomes complex, and in that the number of component parts increases.

SUMMARY OF THE INVENTION

In view of the above-described circumstances, it is an object of the present invention to provide a winding device in which a guide member for winding the leading end of a photosensitive material is accommodated compactly, to improve the operating efficiency in the removal of the photosensitive material wound in roll form and make the device compact.

Another object of the present invention is to provide a winding device in which the leading end of the photosensitive material can be wound around a winding core for taking up the photosensitive material with a simple mechanism.

To these ends, in accordance with one aspect of the present invention, there is provided a winding device comprising: a winding core which is rotatively driven and is capable of taking up an elongated photosensitive material; a guide member which is formed of an elongated material deformable along an outer peripheral surface of the winding core, and which forms a guide passage for the photosensitive material between the guide member and the outer peripheral surface of the winding core in a state in which the guide member is wound around the winding core; a guide arm which is rotatable about a proximal end thereof and is rotated to allow a distal end of the guide arm to be brought into contact with the winding core and to guide the photosensitive material and the guide member along the guide arm from a proximal end side toward a distal end side of the guide arm at a time when the photosensitive material is wound around the winding core; and a guide-member accommodating portion for accommodating the guide member in such a manner as to be capable of paying out and taking up the guide member as the guide-member accommodating portion is rotatively driven, the guide-member accommodating portion being adapted to pay out the guide member so as to allow the guide member to be wound around the winding core.

The winding device structured as described above operates as follows.

When the elongated photosensitive material is taken up onto the winding core, first, the guide arm which is rotatable about its proximal end is rotated to cause a distal end of the guide arm to be brought into contact with the winding core. Then, as the guide-member accommodating portion pays out the guide member, the guide member is extended while being guided by the guide arm, and the guide member is hence wound around the winding core while deforming along the outer peripheral surface of the winding core. When the guide member is thus wound around the winding core, a guide passage for the photosensitive material is formed between the outer peripheral surface of the winding core and the guide member.

Subsequently, when the photosensitive material is fed toward the winding core in a state in which the winding core is rotating, the photosensitive material is fed into the guide passage between the outer peripheral surface of the winding core and the guide member while being guided by the guide arm. Then, after the photosensitive material is wound by one or more revolutions of the winding core, the photosensitive material is taken up naturally by simply rotating the winding core.

When the photosensitive material thus begins to be taken up, the guide member is rewound toward the guide-member accommodating portion side, and the guide arm is then rotated to move away from the winding core.

Accordingly, the leading end of the photosensitive material can be wound around the winding core by the simple mechanism in which the guide member which is guided by one guide arm is wound around the winding core while deforming along the outer peripheral surface of the winding core, so that the number of component parts used does not increase. In addition, since the mechanism in which one guide member is guided by one guide arm is used, a large space is not required for the device due to these members, so that the device is prevented from becoming large.

Furthermore, since the guide member is rewound into the guide-member accommodating portion and is therefore accommodated compactly, the guide member does not constitute a hindrance when the photosensitive material wound in roll form is removed, thereby improving the operating efficiency.

In accordance with another aspect of the present invention, there is provided a winding device comprising: a winding core which is rotatively driven and is capable of taking up an elongated photosensitive material; a guide member which is formed of an elongated material deformable along an outer peripheral surface of the winding core, and which forms a guide passage for the photosensitive material between the guide member and the outer peripheral surface of the winding core in a state in which the guide member is wound around the winding core; a guide arm which is rotatable about a proximal end thereof and is rotated to guide the photosensitive material and the guide member along the guide arm from a proximal end side toward a distal end side of the guide arm at a time when the photosensitive material is wound around the winding core; a roller supported rotatably at a distal end of the guide arm and capable of coming into contact with the winding core as the guide arm is rotated; an opening/closing member which is openably and closeably attached to the guide arm and which forms a wall portion for guiding the photosensitive material; and a guide-member accommodating portion for accommodating the guide member in such a manner as to be capable of paying out and taking up the guide member as the guide-member accommodating portion is rotatively driven, the guide-member accommodating portion being adapted to pay out the guide member so as to allow the guide member to be wound around the winding core.

The winding device structured as described above operates as follows.

In accordance with the above-described aspect of the present invention, the winding device operates in a manner similar to that of the first aspect of the present invention. Furthermore, the roller which is rotatably supported at the distal end of the guide arm is brought into contact with the winding core as the guide arm is rotated. The opening/closing member which is openably and closeably attached to the guide arm forms a wall portion for guiding the photosensitive material. For this reason, friction between the guide arm and the winding core is reduced when the winding core is rotated, so that the winding core is not abraded or the like. After the photosensitive material has been wound around the winding core, the opening/closing member is opened by the tension of the photosensitive material when the guide arm is rotated, thereby easily separating the photosensitive material from the guide arm.

The above and other objects, features and advantages of the present invention will become more apparent from the following detailed description of the invention when read in conjunction with the accompanying drawings.

DETAILED DESCRIPTION OF THE PREFERRED EMBODIMENT

An embodiment of a winding device in accordance with the present invention is shown in FIGS. 1 to 6, and a description will be given of the embodiment with reference to these drawings.

Figure 1:
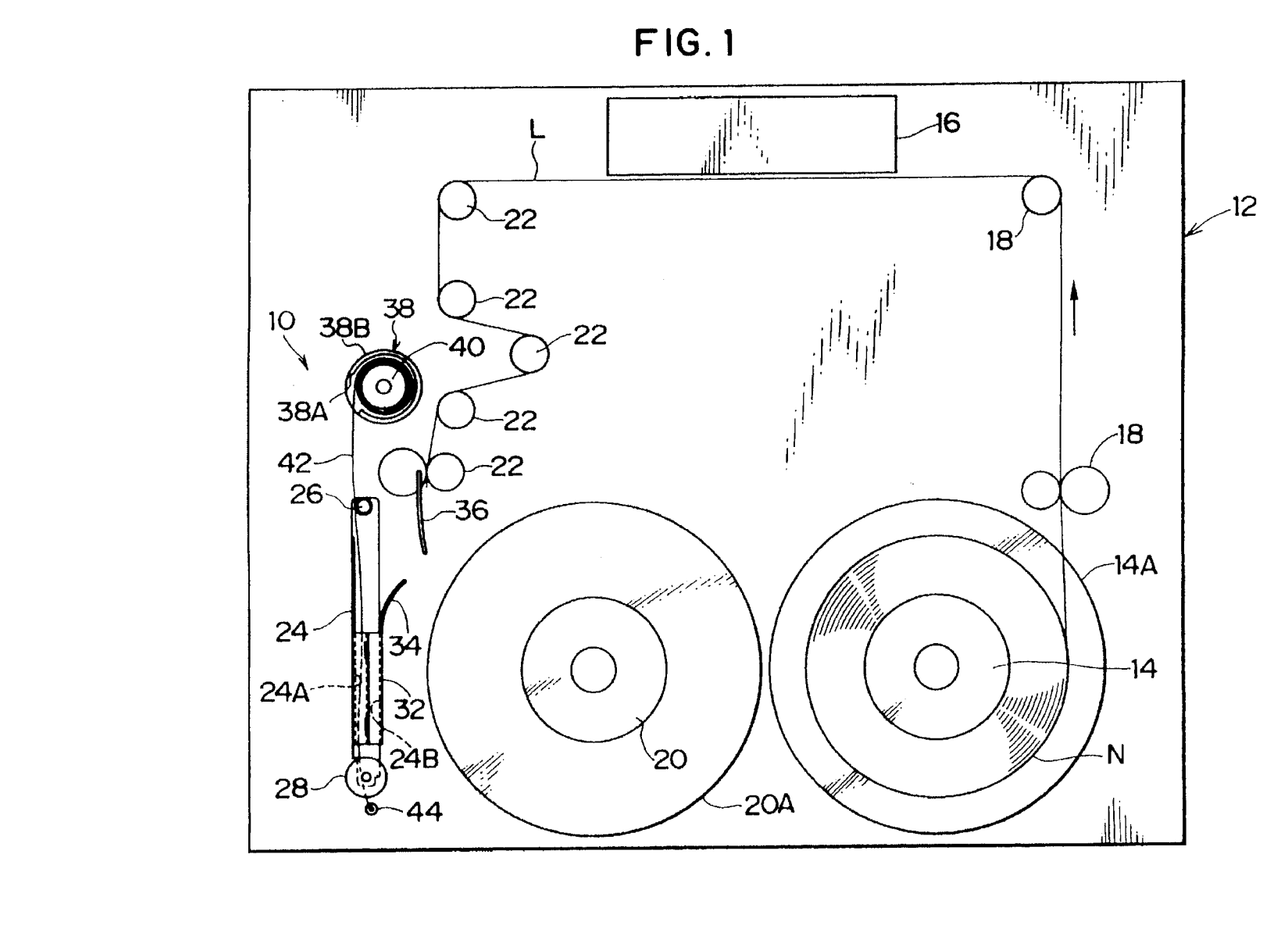
FIG. 1 is a schematic plan view of an inspecting apparatus to which an embodiment of the winding device in accordance with the present invention is applied.

As shown in FIG. 1, a winding device 10 of the present embodiment is applied to an inspecting apparatus 12 in order to wind a negative film N around a winding core of a takeup shaft.

This inspecting apparatus 12 rotatably supports a winding core 14 used for feeding the negative film and having a flange 14A. The negative film N, which is formed in advance in an elongated shape by connecting 50 negative films N, is wound around the winding core 14. A leader tape L is attached to a leading end of the negative film N.

A plurality of transport rollers 18 which are rotatively driven are disposed between the winding core 14 and an inspecting section 16 for measuring the image densities of frames of the negative film N. A transport passage for the negative film N is formed by these transport rollers 18.

A winding core 20, which serves as a takeup shaft detachably connected to an unillustrated motor and which is provided with a flange 20A enlarged in the radial direction of the winding core 20, is disposed downstream of the inspecting section 16 in the transporting direction and at a position adjacent to the winding core 14. Further, a plurality of transport rollers 22 which are rotatively driven are disposed between the inspecting section 16 and the winding core 20. Therefore, the negative film N for which the measurement of image densities in the inspecting section 16 has been completed is transported by these transport rollers 22, and is sent to the winding core 20.

Figure 2:
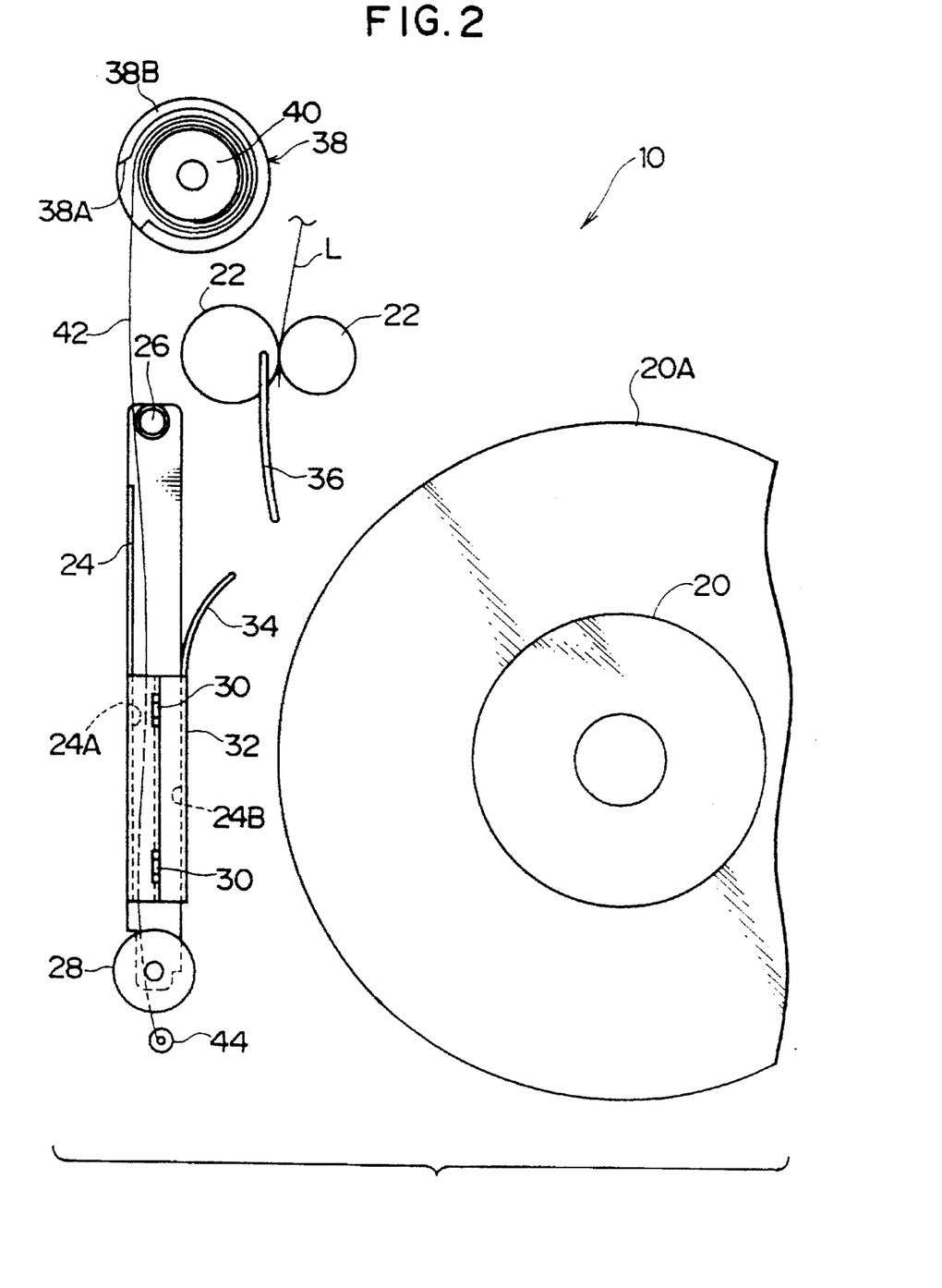
FIG. 2 is an enlarged plan view of the embodiment of the winding device in accordance with the present invention, and illustrates a state in which a guide arm is retracted.

As shown in FIGS. 1 and 2, a guide arm 24 is disposed at a position adjacent to the winding core 20 by being supported at its proximal end in such a manner as to be rotatable about a rotating shaft 26. The rotating shaft 26 is connected to an unillustrated motor. A roller 28 having a width smaller than those of the negative film N and the leader tape L is rotatably supported at a distal end of the guide arm 24.

Figure 6:
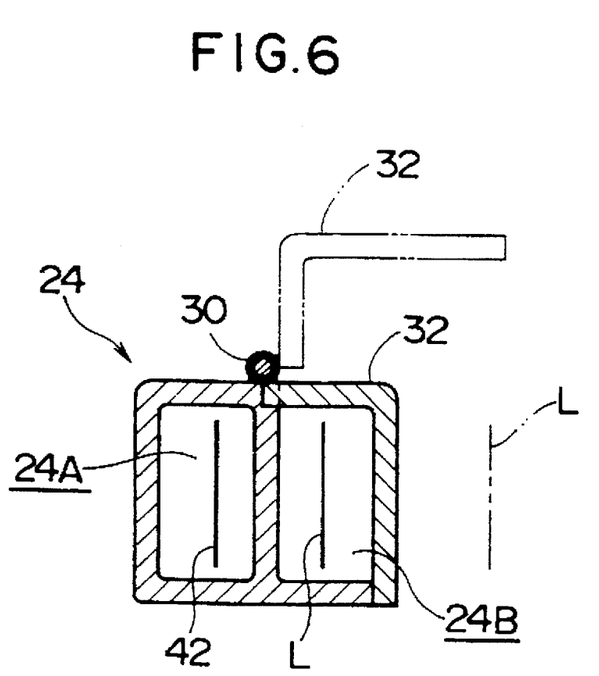
FIG. 6 is a cross-sectional view taken in the direction of arrows along line 6—6 in FIG. 4.

As shown in FIGS. 1 and 6, a first passage 24A and a second passage 24B respectively having rectangular cross sections are formed inside the guide arm 24. The second passage 24B is structured such that a wall portion 32, which is an opening/closing member and forms a part of the wall surface of the second passage 24B, is openable by means of hinges 30.

A guide plate 34 is attached to the guide arm 24 at a longitudinally intermediate portion of the guide arm 24, while a guide plate 36 is attached to a vicinity of the furthest downstream transport roller 22. In the state shown in FIGS. 3 and 4, the leader tape L is adapted to be guided by the guide plate 34 and the guide plate 36. The leader tape L which has passed between the guide plates 34 and 36 is led into the second passage 24B, and is sent from the proximal end side toward the distal end side of the guide arm 24 while being guided by the second passage 24B.

A hollow cylindrical wall 38B having an opening 38A in a portion thereof is disposed at a position adjacent to the proximal end of the guide arm 24. A rotating shaft 40 connected to an unillustrated motor is disposed in the hollow cylindrical wall 38B. Namely, an accommodating portion 38 which is a guide-member accommodating portion is formed by the hollow cylindrical wall 38B, the rotating shaft 40, and the like.

A proximal end of a leaf spring 42, which is a guide member having a widthwise dimension substantially equal to the widthwise dimensions of the negative film N and the leader tape L and which is curled in advance, is wound around the rotating shaft 40. Further, the leaf spring 42 passes through the first passage 24A inside the guide arm 24 and extends to the distal end of the guide arm 24. A rotatable small roller 44 is attached to a distal end of the leaf spring 42.

Unillustrated motors which are respectively connected to the winding core 20, the rotating shaft 26, and the rotating shaft 40 are connected to a controlling device (not shown), and are rotatable individually.

Next, a description will be given of the operation of the above-described embodiment.

Figure 3:
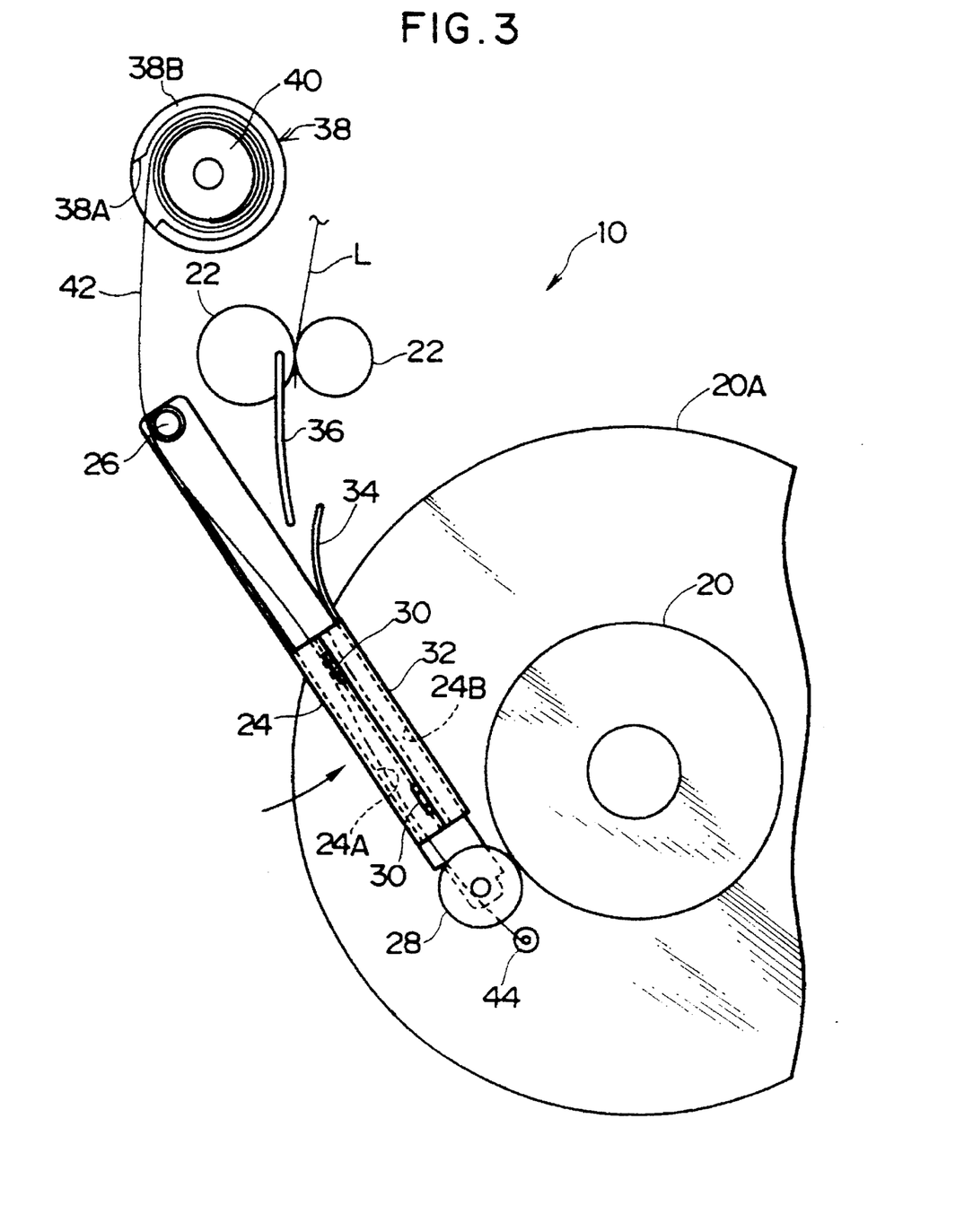
FIG. 3 is an enlarged plan view of the embodiment of the winding device in accordance with the present invention, and illustrates a state in which the guide arm is rotated toward a winding core.
Figure 4:
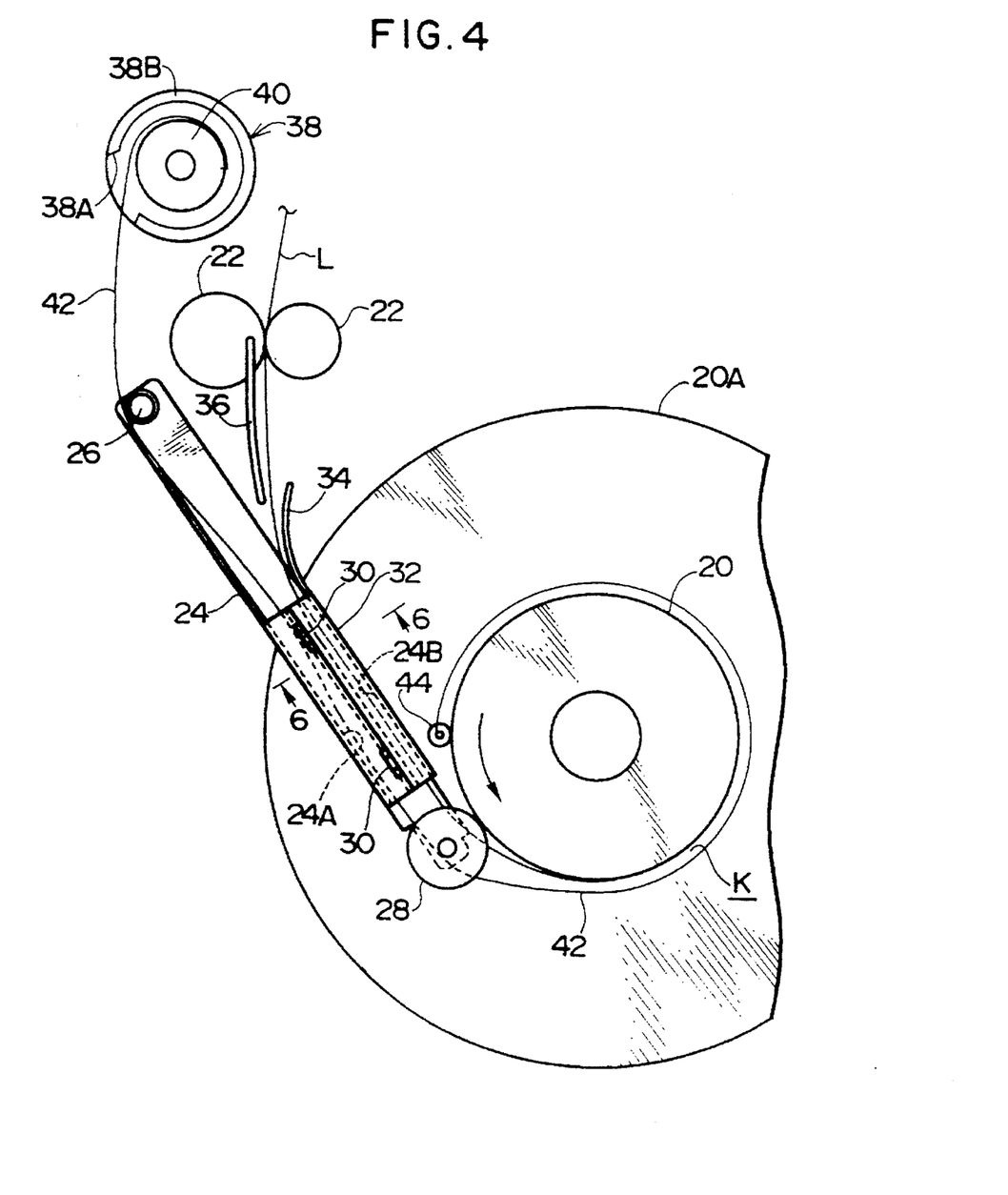
FIG. 4 is an enlarged plan view of the embodiment of the winding device in accordance with the present invention, and illustrates a state in which a leaf spring is wound around the winding core.

When the elongated negative film N is wound around the winding core 20, first, the guide arm 24 which is rotatable about the rotating shaft 26 is rotated by the motor, and causes the roller 28 supported at the distal end of the guide arm 24 to be brought into contact with the winding core 20, as shown in FIG. 3. Then, as shown in FIG. 4, as the accommodating portion 38 pays out the leaf spring 42 through the opening 38A, the leaf spring 42 is extended while being guided by the first passage 24A of the guide arm 24.

At this time, since the leaf spring 42 is curled in advance, the small roller 44 rotates in contact with the outer peripheral surface of the winding core 20, and the leaf spring 42 is deformed along the outer peripheral surface of the winding core 20, and is wound around the winding core 20. Then, when the leaf spring 42 is thus wound around winding core 20, a guide passage K for the negative film N is formed between the outer peripheral surface of the winding core 20 and the leaf spring 42. Incidentally, since the small roller 44 which is guided by the flange of the winding core 20 rotates in contact with the outer peripheral surface of the winding core 20, the leaf spring 42 is smoothly wound while being guided by the flange 20A.

Subsequently, in the state in which the winding core 20 is being rotated, the transport rollers 18 and 22 are rotated, and if the leader tape L which has passed through the inspecting section 16 is fed toward the winding core 20, the leader tape L is fed into the guide passage K between the outer peripheral surface of the winding core 20 and the leaf spring 42 while being guided by the guide arm 24 and being guided by a side surface of the roller 28 and the flange 20A. After the leader tape L is wound by one or more revolutions of the winding core 20, the negative film N following the leader tape L is taken up naturally onto the winding core 20 merely by rotating the winding core 20.

When the winding core 20 is rotated, since the roller 28 is rotatably disposed at the distal end of the guide arm 24, the friction between the winding core 20 and the guide arm 24 is reduced, so that the winding core 20 is not abraded or the like.

Figure 5:
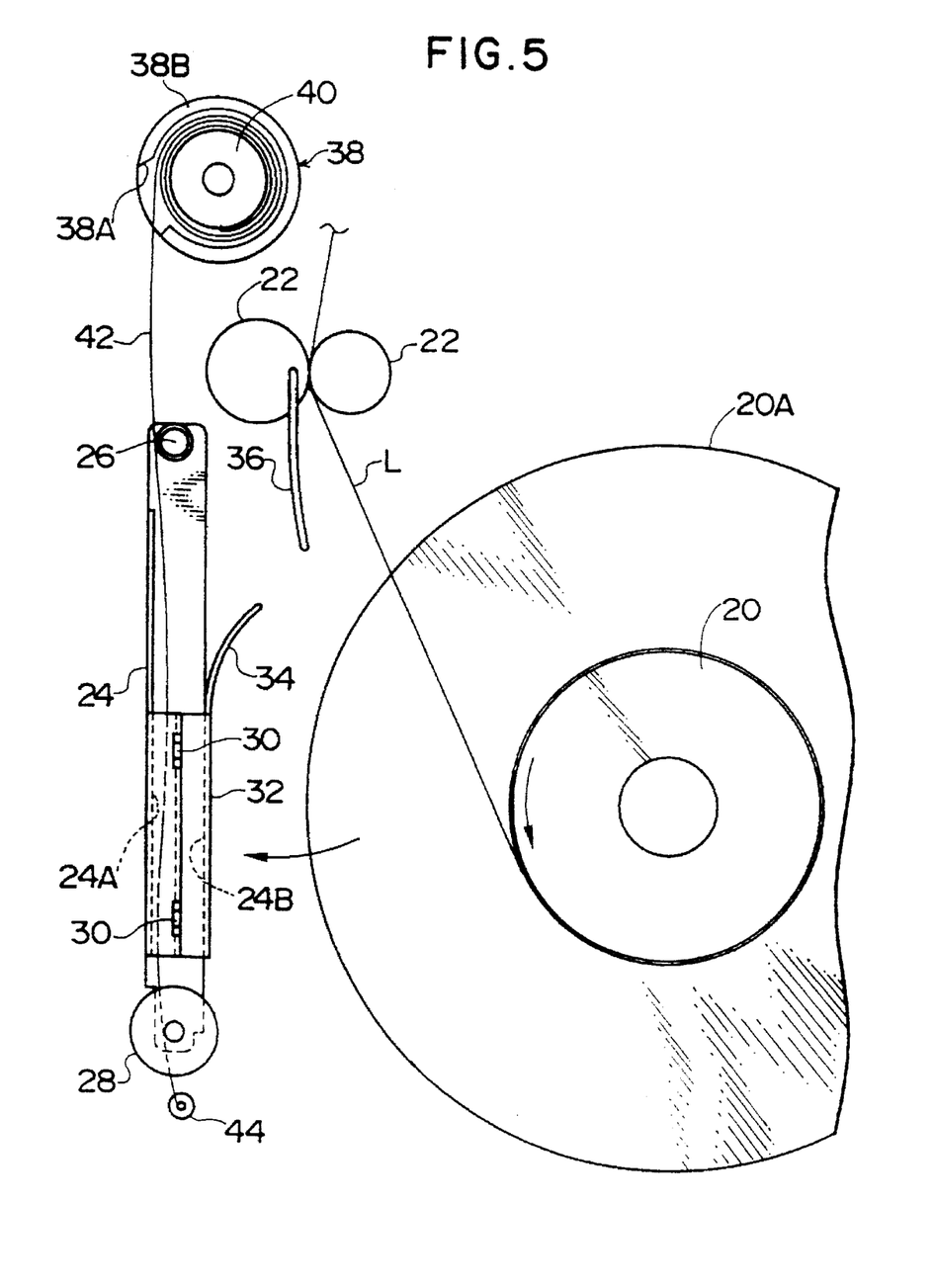
FIG. 5 is an enlarged plan view of the embodiment of the winding device in accordance with the present invention, and illustrates a state in which the winding of a negative film is completed.

Subsequently, after the leaf spring 42 is rewound toward the accommodating portion 38 side so as to assume the state shown in FIG. 3, the guide arm 24 is pulled away from the winding core 20 so as to assume the state shown in FIG. 5. When the guide arm 24 is rotated at this time, the wall portion 32 is opened by the tension of the negative film N as indicated by the two-dotted dash line in FIG. 6, so that the negative film N is easily separated from the guide arm 24.

As described above, the leader tape L attached to the leading end of the negative film N can be wound around the winding core 20 by virtue of a simple mechanism in which the leaf spring 42 guided by one guide arm 24 is wound around the winding core 20 while being deformed along the outer peripheral surface of the winding core 20. Hence, the number of component parts used in the winding device does not increase. Additionally, since the mechanism is arranged such that one leaf spring 42 is guided by by one guide arm 24, the device does not require a large space for such members, so that the device does not become large.

Further, since the leaf spring 42 is unwound toward the accommodating portion 38 side and is accommodated compactly, the leaf spring 42 does not constitute a hindrance at times such as the time when the negative film N wound in roll form is removed together with the winding core 20, with the result that the operating efficiency improves.

It should be noted that although, in the above-described embodiment, the negative film is used as the photosensitive material, the present invention is also applicable to elongated photographic printing papers and to elongated materials other than photosensitive materials, instead of the negative film. Furthermore, it is not absolutely necessary that a leader tape is attached to the leading end of the negative film, and the leading end of the negative film may be directly wound around the winding core.

Although in the above-described embodiment the leaf spring is used as the guide member, it is possible to use a flexible wire-like material, such as piano wire, which can be deformed along the outer peripheral surface of the winding core. Further, although in the above-described embodiment a description has been given of the winding device of the present invention which is used as a winding device for the inspecting apparatus, the winding device may be used for apparatuses other than the inspecting apparatus.

The determination of the timing at which the leaf spring 42 is unwound toward the accommodating portion 38 side after the leader tape L is wound around the winding core 20 can be carried out by the controlling device by mounting a torque-detecting sensor on the winding core 20 and by detecting fluctuations in the torque by means of the sensor; however, the present invention is not limited to the same.

Furthermore, although in the above-described embodiment the rotating shaft 40 for taking up the leaf spring 42 and the rotating shaft 26 for rotating the guide arm 24 are provided separately, these shafts may be disposed coaxially instead.

As described above, the winding device in accordance with the present invention offers an outstanding advantage in that the guide member for winding the leading end of a photosensitive material is accommodated compactly, thereby improving the operating efficiency in the removal of the photosensitive material wound in roll form and making the device compact. Further, the winding device in accordance with the present invention has an additional advantage in that the leading end of the photosensitive material can be wound around the winding core for taking up the photosensitive material with a simple mechanism.

What is claimed is:

1. A winding device comprising:
   a winding core which is rotatively driven and is capable of taking up an elongated photosensitive material;
   a guide member which is formed of an elongated material deformable along an outer peripheral surface of said winding core, and which forms a guide passage for the photosensitive material between said guide member and the outer peripheral surface of said winding core in a state in which said guide member is wound around said winding core;
   a guide arm which is rotatable about a proximal end thereof and is rotated to allow a distal end of said guide arm to be brought into contact with said winding core and to guide the photosensitive material and said guide member along said guide arm from a proximal end side toward a distal end side of said guide arm at a time when the photosensitive material is wound around said winding core; and
   a guide-member accommodating portion for accommodating said guide member in such a manner as to be capable of paying out and taking up said guide member as said guide-member accommodating portion is rotatively driven, said guide-member accommodating portion being adapted to pay out said guide member so as to allow said guide member to be wound around said winding core.

2. A winding device according to claim 1, wherein said winding core has a flange enlarged in a radial direction of said winding core, and said flange serves as a guide when the elongated photosensitive material is taken up.

3. A winding device according to claim 1, wherein a small roller is rotatably attached to a distal end of said guide member, and said small roller is brought into contact with the outer peripheral surface of said winding core in a state in which said guide member is wound around said winding core.

4. A winding device according to claim 1, wherein said guide member is formed by a leaf spring.

5. A winding device according to claim 1, wherein said guide member is formed by a leaf spring having a widthwise dimension substantially equal to a widthwise dimension of the photosensitive material.

6. A winding device according to claim 1, wherein said guide member is formed of a wire-like material.

7. A winding device according to claim 1, wherein said guide arm has a passage for guiding the photosensitive material and a passage for guiding said guide member, said two passages being arranged adjacent to each other, said passage for guiding the photosensitive material being arranged in face-to-face relation to said winding core.

8. A winding device according to claim 1, wherein said guide arm is provided with a guide plate for guiding the photosensitive material.

9. A winding device according to claim 1, wherein said guide-member accommodating portion has a rotating shaft which is capable of paying out and taking up said guide member as said rotating shaft is rotatively driven.

10. A winding device according to claim 1, wherein said guide-member accommodating portion has a rotating shaft which is rotatively driven with said guide member wound therearound and a hollow cylindrical wall disposed around said rotating shaft and having an opening in a portion of said hollow cylindrical wall, said guide member wound around said rotating shaft being adapted to pass through said opening and to be extended toward said guide arm.

11. A winding device according to claim 1, wherein said guide-member accommodating portion is disposed in a vicinity of a center of rotation of said guide arm.

12. A winding device comprising:
    a winding core which is rotatively driven and is capable of taking up an elongated photosensitive material;
    a guide member which is formed of an elongated material deformable along an outer peripheral surface of said winding core, and which forms a guide passage for the photosensitive material between said guide member and the outer peripheral surface of said winding core in a state in which said guide member is wound around said winding core;
    a guide arm which is rotatable about a proximal end thereof and is rotated to guide the photosensitive material and said guide member along said guide arm from a proximal end side toward a distal end side of said guide arm at a time when the photosensitive material is wound around said winding core;
    a roller supported rotatably at a distal end of said guide arm and capable of coming into contact with said winding core as said guide arm is rotated;
    an opening/closing member which is openably and closeably attached to said guide arm and which forms a wall portion for guiding the photosensitive material; and
    a guide-member accommodating portion for accommodating said guide member in such a manner as to be capable of paying out and taking up said guide member as said guide-member accommodating portion is rotatively driven, said guide-member accommodating portion being adapted to pay out said guide member so as to allow said guide member to be wound around said winding core.

13. A winding device according to claim 12, wherein said winding core has a flange enlarged in a radial direction of said winding core, and said flange serves as a guide when the elongated photosensitive material is taken up by said winding core as the photosensitive material is nipped by a side surface of said roller and said flange.

14. A winding device according to claim 12, wherein said winding core has a flange enlarged in a radial direction of said winding core, a small roller is rotatably attached to a distal end of said guide member, and said small roller is brought into contact with the outer peripheral surface of said winding core in a state in which said guide member is wound around said winding core while being guided by said flange.

15. A winding device according to claim 12, wherein said roller is formed with a width smaller than a width of the photosensitive material.

16. A winding device according to claim 12, wherein said said opening/closing member is openably and closeably attached to said guide arm by means of a hinge.

17. A winding device according to claim 12, wherein said guide arm has a passage for guiding the photosensitive material and a passage for guiding said guide member, said two passages being arranged adjacent to each other, said passage for guiding the photosensitive material being arranged in face-to-face relation to said winding core, said opening/closing member forming a wall portion of said passage for guiding the photosensitive material.

18. A winding device comprising:

a winding core disposed in an inspecting apparatus for measuring an image density of an elongated negative film, and capable of taking up the negative film by being rotatively driven after measurement of the image density;

a guide member formed of an elongated material which is deformable along an outer peripheral surface of said winding core, and forming a guide passage for a leader tape attached to a leading end of the negative film between said guide member and the outer peripheral surface of said winding core in a state in which said guide member is wound around said winding core;

a guide arm which is rotatable about a proximal end thereof and is rotated when the leader tape is wound around said winding core, and which is adapted to guide the leader tape and said guide member along said guide arm from a proximal end side toward a distal end side of said guide arm;

a roller which is rotatably supported at a distal end of said guide arm and is capable of coming into contact with said winding core as said guide arm is rotated;

an opening/closing member which is openably and closeably attached to said guide arm and forms a wall portion for guiding the leader tape; and a guide-member accommodating portion for accommodating said guide member in such a manner as to be capable of paying out and taking up said guide member as said guide-member accommodating portion is rotatively driven, said guide-member accommodating portion being adapted to pay out said guide member so as to allow said guide member to be wound around said winding core.

19. A winding device according to claim 18, wherein said guide member is formed by a leaf spring having a width substantially equal to respective widths of the negative film and the leader tape.

20. A winding device according to claim 18, wherein the elongated negative film which is taken up onto said winding core is formed into an elongated shape by connecting a plurality of negative films, and a flange serving as a guide when the negative film is taken up is formed on said winding core in such a manner as to be enlarged in a radial direction of said winding core.

* * * * *